US011012308B2

(12) United States Patent
Frison et al.

(10) Patent No.: US 11,012,308 B2
(45) Date of Patent: *May 18, 2021

(54) METHOD FOR CONFIGURING A WIRELESS FIRE DETECTION SYSTEM

(71) Applicant: LIFE SAFETY DISTRIBUTION AG., Hengnau (CH)

(72) Inventors: Andrea Frison, Monfalcone (IT); Daniel Merli, Trieste (IT); Daniel Polito, Cerviganno del Friuli (IT)

(73) Assignee: Life Safety Distribution GMBH, Hegnau (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,675

(22) Filed: Dec. 30, 2019

(65) Prior Publication Data
US 2020/0145289 A1    May 7, 2020

Related U.S. Application Data

(63) Continuation of application No. 15/153,861, filed on May 13, 2016, now Pat. No. 10,523,510.

(51) Int. Cl.
*G08B 1/08* (2006.01)
*H04L 12/24* (2006.01)
(Continued)

(52) U.S. Cl.
CPC .......... *H04L 41/0886* (2013.01); *G08B 17/10* (2013.01); *G08B 25/003* (2013.01);
(Continued)

(58) Field of Classification Search
CPC ...... G08B 25/00; G08B 25/10; G08B 25/007; G08B 17/10; G08B 25/003; H04W 24/02;
(Continued)

(56) References Cited

U.S. PATENT DOCUMENTS

| 4,638,453 A | 1/1987 | Gran et al. |
| 6,624,750 B1 | 9/2003 | Marman et al. |

(Continued)

FOREIGN PATENT DOCUMENTS

| EP | 2469493 A1 | 6/2012 |
| WO | 2010097964 A1 | 9/2010 |

*Primary Examiner* — Toan N Pham
(74) *Attorney, Agent, or Firm* — Brooks, Cameron & Huebsch, PLLC

(57) ABSTRACT

There is provided a method for configuring a plurality of network devices of a wireless fire detection system comprising a configuration device, a gateway device wirelessly communicating with the configuration device, and the plurality of network devices wirelessly communicating with the gateway device and among them, the method comprising: determining, by the configuration device, configuration data of each one of the plurality of network devices for configuring each one of the plurality of network devices; transmitting, by the configuration device, the configuration data to the gateway device; and upon receiving the configuration data from the configuration device, distributing, by the gateway device, the configuration data to each one of the plurality of network devices according to predetermined time slots for transmitting the configuration data.

20 Claims, 4 Drawing Sheets

(51) Int. Cl.
  *G08B 25/00* (2006.01)
  *G08B 17/10* (2006.01)
  *G08C 15/06* (2006.01)
  *H04L 29/08* (2006.01)
  *H04W 72/00* (2009.01)
  *H04W 72/04* (2009.01)

(52) U.S. Cl.
  CPC .......... *G08C 15/06* (2013.01); *H04L 41/0853* (2013.01); *H04L 67/12* (2013.01); *H04W 72/005* (2013.01); *H04W 72/0446* (2013.01)

(58) Field of Classification Search
  CPC . H04W 4/005; H04W 84/18; H04W 72/0446; H04W 784/22
  See application file for complete search history.

(56) References Cited

U.S. PATENT DOCUMENTS

| | | | |
|---|---|---|---|
| 7,385,517 B2* | 6/2008 | Andres | ............... G08B 7/06 340/506 |
| 8,553,664 B2* | 10/2013 | Bansal | ............ G08B 25/003 370/338 |
| 2005/0105559 A1 | 5/2005 | Cain et al. | |
| 2007/0263570 A1 | 11/2007 | Alapuranen et al. | |
| 2010/0061350 A1 | 3/2010 | Flammer | |
| 2012/0190325 A1 | 7/2012 | Abu-Hakima et al. | |
| 2014/0003447 A1 | 1/2014 | Deb et al. | |

\* cited by examiner

ME THOD FOR CONFIGURING A WIRELESS
FIRE DETECTION SYSTEM

PRIORITY INFORMATION

This application is a continuation of U.S. application Ser. No. 15/153,861, filed May 13, 2016, the contents of which are incorporated herein by reference.

FIELD OF INVENTION

The present invention generally relates to a method for configuring a wireless fire detection system. Specifically, the present invention relates to a method for configuring network devices of a wireless fire detection system, and a wireless fire detection system using the same.

BACKGROUND OF INVENTION

Various types of wireless fire detection systems are known. In many of these systems, modules such as fire, smoke or gas detectors are coupled.

For instance, there is known a wireless fire detection system using a cascading wave communication protocol which works on the principle of data aggregation. The system is designed for use with compatible intelligent fire systems using proprietary communication protocols. The system translates device coding from the, radio domain to communication loop address recognized by the Control and Indicating Equipment (CIE). Radio frequency communication is established using the cascading wave communication protocol providing a deterministic redundant communication without congesting the network in high traffic scenarios.

Such known wireless fire detection system is illustrated in FIG. 1. The wireless fire detection system 13 is connected to a wired fire detection system 11 via at least one gateway 12. As illustrated in FIG. 1, the wireless fire detection system can include a plurality of network devices. As a non exhaustive list, such devices can include a plurality of wireless detectors 13-1 and a plurality of wireless call points 13-2. A configuration device 14 is available for system configuration and maintenance.

There is an ongoing need to reduce the costs of installing and maintaining such wireless fire detection system. There is also an ongoing need to be able to conveniently and cost-efficiently modify the configuration of such wireless fire detection system, due to e.g. remodeling or expansion of a monitored region.

Specifically, in order to guarantee complete control of the network configuration, the wireless network must be designed off line either by an expert operator or by taking advantage of some computer aided methods that—knowing the characteristics of the building where the wireless fire detection system is going to be installed and the position of the devices—will generate a network configuration that accomplishes the tasks of optimizing the system performance, satisfying network design constraints, and optimizing network robustness, thereby keeping into account the network devices' transmission range and installation site environmental attenuations.

At the end of the network design phase, network parameters (such as links configuration, communication channels and sync word) must be separately downloaded into each network device. Since the network devices are usually manually programmed by means of a special tool capable to communicate with each of them, the network devices must be in its communication range and the expert operator must program each network device before to install it. Therefore, configuration of the wireless network is a time consuming process and lacks user-friendliness.

SUMMARY OF INVENTION

In view of the above, the object of the present invention consists in providing an improved method for configuring a plurality of network devices of a wireless fire detection system by means of which configuration of the plurality of network devices 15 made less time consuming and more user-friendly. In this regard, it is desired to reduce the costs of installing and maintaining the wireless fire detection system and to conveniently and cost-efficiently modify the configuration of the wireless fire detection system.

The object of the present invention is accomplished by the method for configuring a plurality of network devices of a wireless fire detection system as set out in independent claim 1. Advantageous developments are defined in the dependent claims.

According to a first aspect of the present invention, there is provided a method for configuring a plurality of network devices of a wireless fire detection system comprising a configuration device, a gateway device wirelessly communicating with the configuration device, and the plurality of network devices wirelessly communicating with the gateway device and among them, the method comprising: determining, by the configuration device, configuration data of each one of the plurality of network devices for configuring each one of the plurality of network devices; transmitting, by the configuration device, the configuration data to the gateway device; and upon receiving the configuration data from the configuration device, distributing, by the gateway device, the configuration data to each one of the plurality of network devices according to predetermined time slots for transmitting the configuration data. When a device, is configured it acts as a radio repeater in order to make possible the configuration of the devices that are not in the range of radio communication of the gateway.

Advantageously, the method further comprises during a first time slot set as a current time slot: determining, by the gateway device, from the configuration data, at least one of the plurality of network devices which is assigned to the time slot directly following the current time slot; transmitting, by the gateway device, the configuration data to the at least one of the plurality of network devices which is assigned to the time slot directly following the current time slot; and receiving, by the at least one of the plurality of network devices which is assigned to the time slot directly following the current time slot, the configuration data.

Advantageously, the method further comprises during a time slot subsequent to the first time slot and set as the current time slot: determining, by each one of the plurality of network devices having received the configuration data in the time slot directly preceding the current time slot, from the configuration data, another at least one of the plurality of network devices which is assigned to the time slot directly following the current time slot; transmitting, by each one of the plurality of network devices having received the configuration data in the time slot directly preceding the current time slot, the configuration data to the other at least one of the plurality of network devices which is assigned to the time slot directly following the current time slot; and receiving, by the other at least one of the plurality of network devices which is assigned to the time slot directly following the current time slot, the configuration data.

Advantageously, the configuration data is transmitted using a default communication channel and a default network ID.

Advantageously, the method further comprises forwarding, by each one of the plurality of network devices having received the configuration data, an acknowledgment signal to the gateway device.

Advantageously, the method further comprises, upon receiving the acknowledgment signal from each one of the plurality of network devices, transmitting, by the gateway device, a broadcast signal to each one of the plurality of network devices indicating that each one of the plurality of network devices is configured.

Advantageously, the method further comprises, upon receiving the broadcast signal from the gateway device, switching, by each one of the plurality of network devices, from the default communication channel and the default network ID to a dedicated communication channel and a dedicated network ID, respectively.

According to a second aspect of the present invention, there is provided a wireless fire detection system, comprising a configuration device, a gateway device wirelessly communicating with the configuration device, and a plurality of network devices wirelessly communicating with the gateway device and among them, wherein the wireless fire detection system performs a method for configuring the plurality of network devices according to the first aspect of the present invention.

BRIEF DESCRIPTION OF DRAWINGS

Advantageous developments of the present invention are exemplified in accordance with the appended drawings.

DETAILED DESCRIPTION OF EMBODIMENTS

Figure 1:
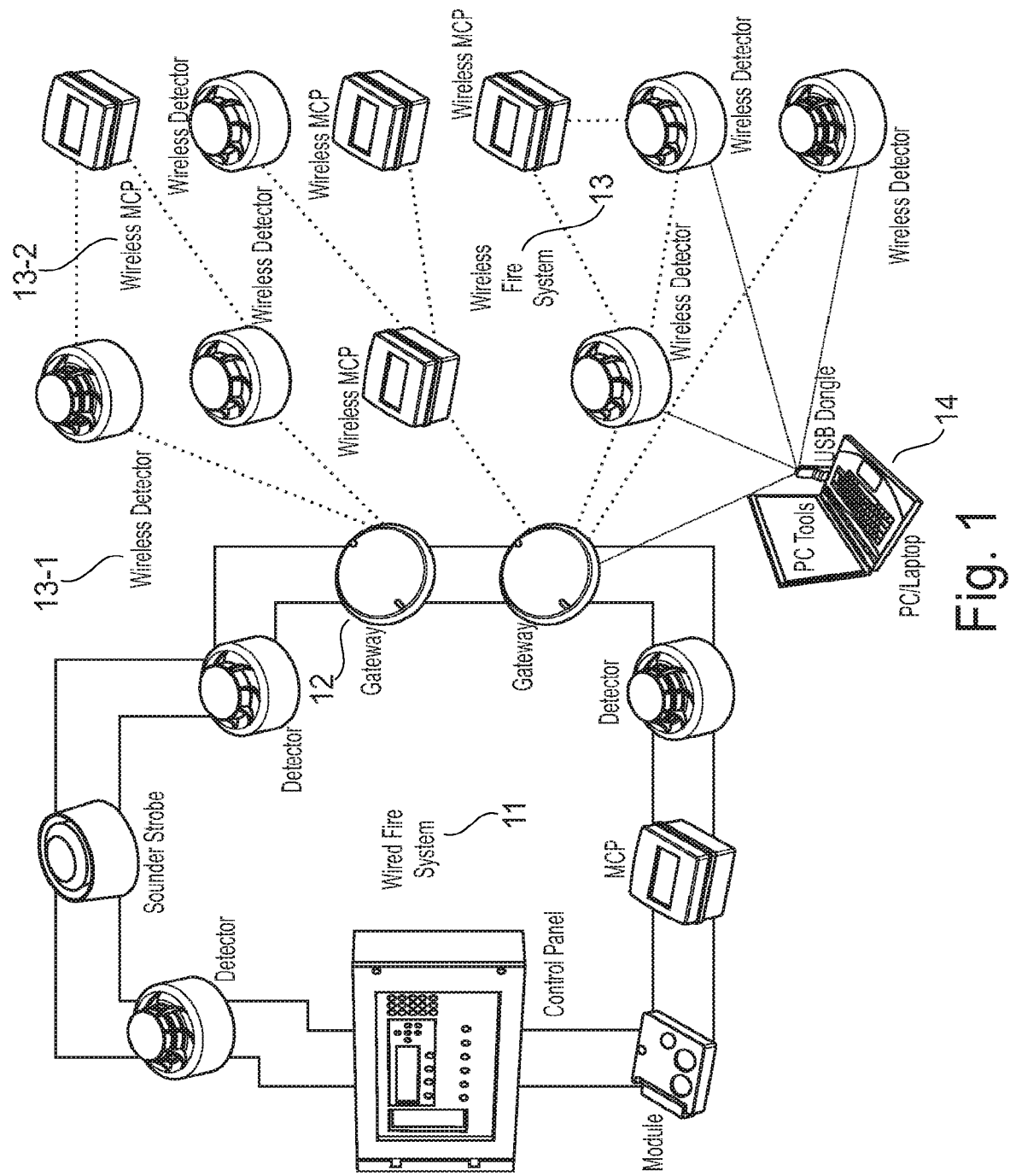
FIG. 1 is a block diagram of a known wireless fire detection system connected to a wired fire detection system via a gateway.
Figure 2:
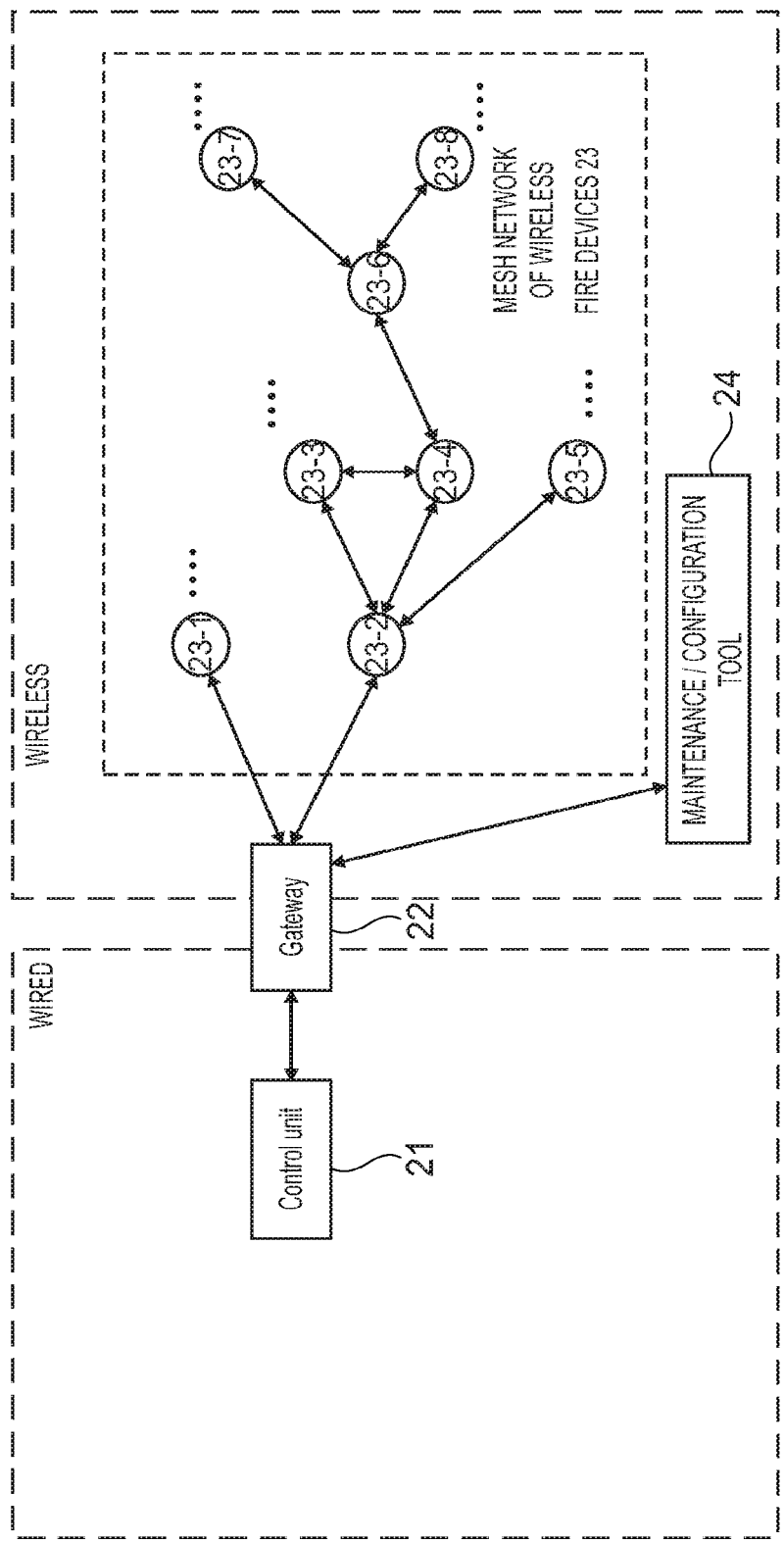
FIG. 2 is a block diagram of a wireless fire detection system illustrating an exemplary communication link connected to a wired fire detection system via a gateway.

FIG. 2 is a block diagram of a wireless fire detection system illustrating an exemplary communication link connected to a wired fire detection system via a gateway.

As illustrated in FIG. 2, the wireless fire detection system comprises a gateway device 22, a configuration device 24 and network devices 23-1 to 23-8 forming a MESH network of wireless fire devices 23. The wireless fire detection system is connected to the wired fire detection system via the gateway device 22, wherein the wired fire detection system comprises e.g. a control unit 21.

The control unit 21 can be implemented with one or more programmable processors, interface circuitry, a transceiver as well as control software. The control software can be stored on a computer readable medium and executed by the processors to implement a communication protocol.

The control unit 21 can communicate with the MESH network of wireless fire devices 23 via the gateway device 22. That is to say, the gateway device 22 connects the network devices 23-1 to 23-8 to the control unit 21. Thereby, the control unit 21 communicates with the gateway device 22 in a wired manner, whereas the gateway device 22 wirelessly communicates with the network devices 23-1 to 23-8.

The configuration device 24 serves for system configuration and maintenance. It can be implemented with one or more programmable processors, wireless interface circuitry, a transceiver and associated antenna(s) as well as control software. The control software can be stored on a computer readable medium and executed by the processors to implement a communication protocol.

For the sake of completeness, the network devices 23-1 to 23-8 are wireless fire devices which configure the MESH network 23 and which are in communication with the control unit 21. Specifically, the network devices 23-1 to 23-8 are in bidirectional communication via predetermined time slots directly or indirectly with the control unit 21.

For instance, as illustrated in FIG. 2, the network devices 23-1 and 23-2 communicate directly with the gateway device 22. The network devices 23-3 to 23-5 in turn communicate directly with the network device 23-2. The network device 23-6 in turn communicates directly with the network device 23-4. The network devices 23-7 and 23-8 in turn communicate directly with the network device 23-6. That is to say, the network devices 23-3 to 23-8 indirectly communicate with the gateway device 22 that can transmit the received data to the control unit 21 and the configuration device 24.

As apparent from FIG. 2, according to the MESH network 23, any of the network devices 23-1 to 23-8 can communicate with any of the other network devices 23-1 to 23-8 directly or indirectly with the gateway device 22, that can transmit the received data to the control unit 21 and the configuration device 24.

In order to do so, the gateway device 22 and the network devices 23-1 to 23-8 are assigned to the predetermined time slots. The network devices 23-1 to 23-8 can e.g. include wireless detectors, wireless sounder strobes and wireless call points.

It is to be noted that the number of network devices 23-1 to 23-8 in FIG. 2 is eight merely by way of example. That is, the number of network devices is not limited to eight at all. Therefore, in the following, it is referred to "a plurality of network devices".

Furthermore, the plurality of network devices 23-1 to 23-8 may communicate with each other in an arrangement different from the arrangement shown in FIG. 2.

Figure 3:
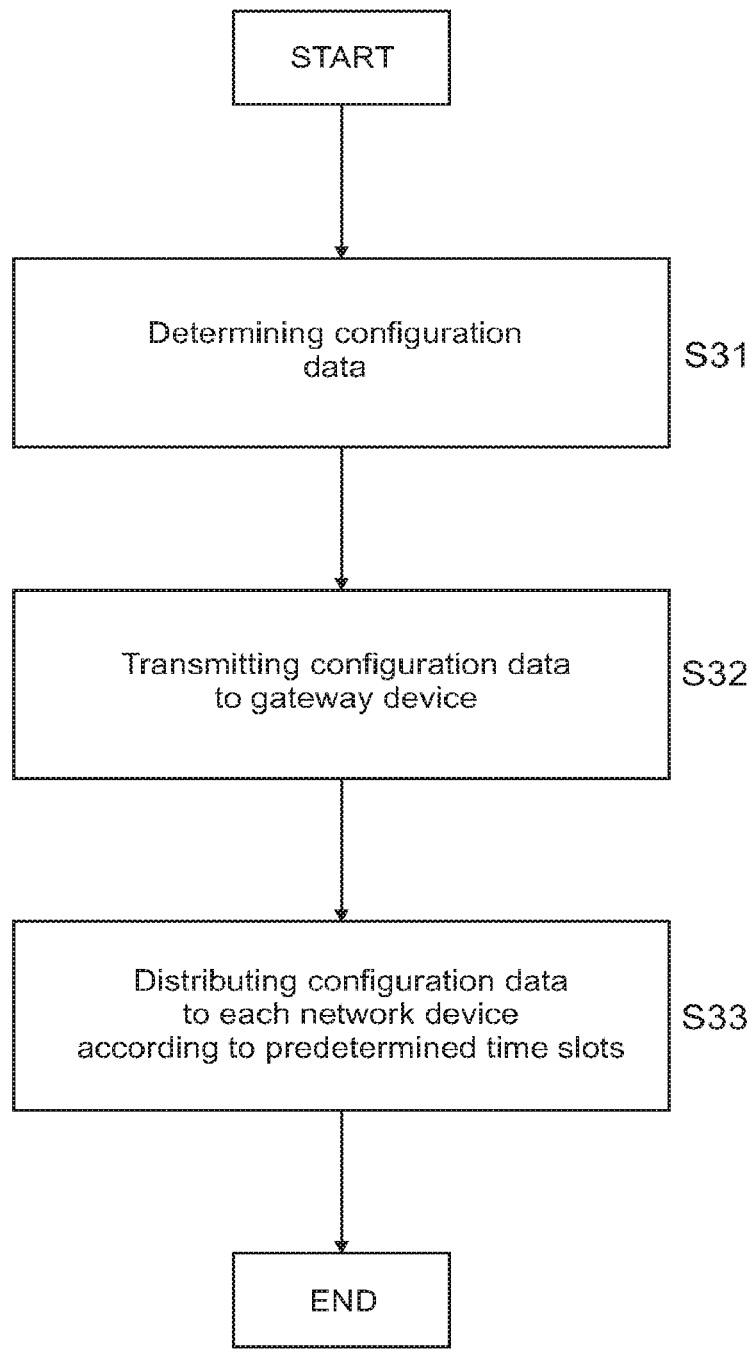
FIG. 3 is a flow chart describing configuration of network devices in accordance with exemplary embodiments.

FIG. 3 is a flow chart describing how the MESH network of wireless fire devices 23 is configured in accordance with exemplary embodiments.

In step S31, the MESH network of wireless fire devices 23 is designed off line by e.g. using the configuration device 24. The configuration device 24 determines the configuration data for each one of the plurality of network devices 23-1 to 23-8.

In step S32, the configuration device 24 transmits the configuration data of each one of the plurality of network devices 23-1 to 23-8 for configuring each one of the plurality of network devices 23-1 to 23-8 to the gateway device 22. In other words, the configuration data are downloaded from the configuration device 24 to the gateway device 22. On this way, the gateway device 22 obtains all data necessary for configuring each one of the plurality of network devices 23-1 to 23-8. Then, it is proceeded to step S33.

In step S33, upon receiving the configuration data from the configuration device 24, the gateway device 22 distributes the configuration data to each one of the plurality of network devices 23-1 to 23-8 according to the predetermined time slots for transmitting the configuration data. In other words, the configuration data are downloaded from the gateway device 22 to each one of the plurality of network devices 23-1 to 23-8. On this way, each one of the plurality of network devices 23-1 to 23-8 obtains all data necessary for configuring each one of the plurality of network devices 23-1 to 23-8. Thereby, each one of the plurality of network devices 23-1 to 23-8 is informed on how to route the next configuration messages.

The configuration data serve for configuring each one of the plurality of network devices 23-1 to 23-8, and thereby the MESH network of wireless fire devices 23. The configuration data include parameters required to configure each one of the plurality of network devices 23-1 to 23-8, and thereby the MESH network of wireless fire devices 23. To be more precise, the configuration data may include the whole set of parameters required by each one of the plurality of network devices 23-1 to 23-8 in order to communicate according to the communication protocol. That is to say, the configuration data may include e.g. a communication pattern (such as communication channels and links configuration), a network ID (sync word), and a list of the network devices 23-1 to 23-8 linked to the respective one of the plurality of network devices 23-1 to 23-8 receiving the configuration data. Furthermore, the configuration data may include information on the predetermined time slots such as to which predetermined time slots each one of the plurality of network devices 23-1 to 23-8 is assigned.

Figure 4:
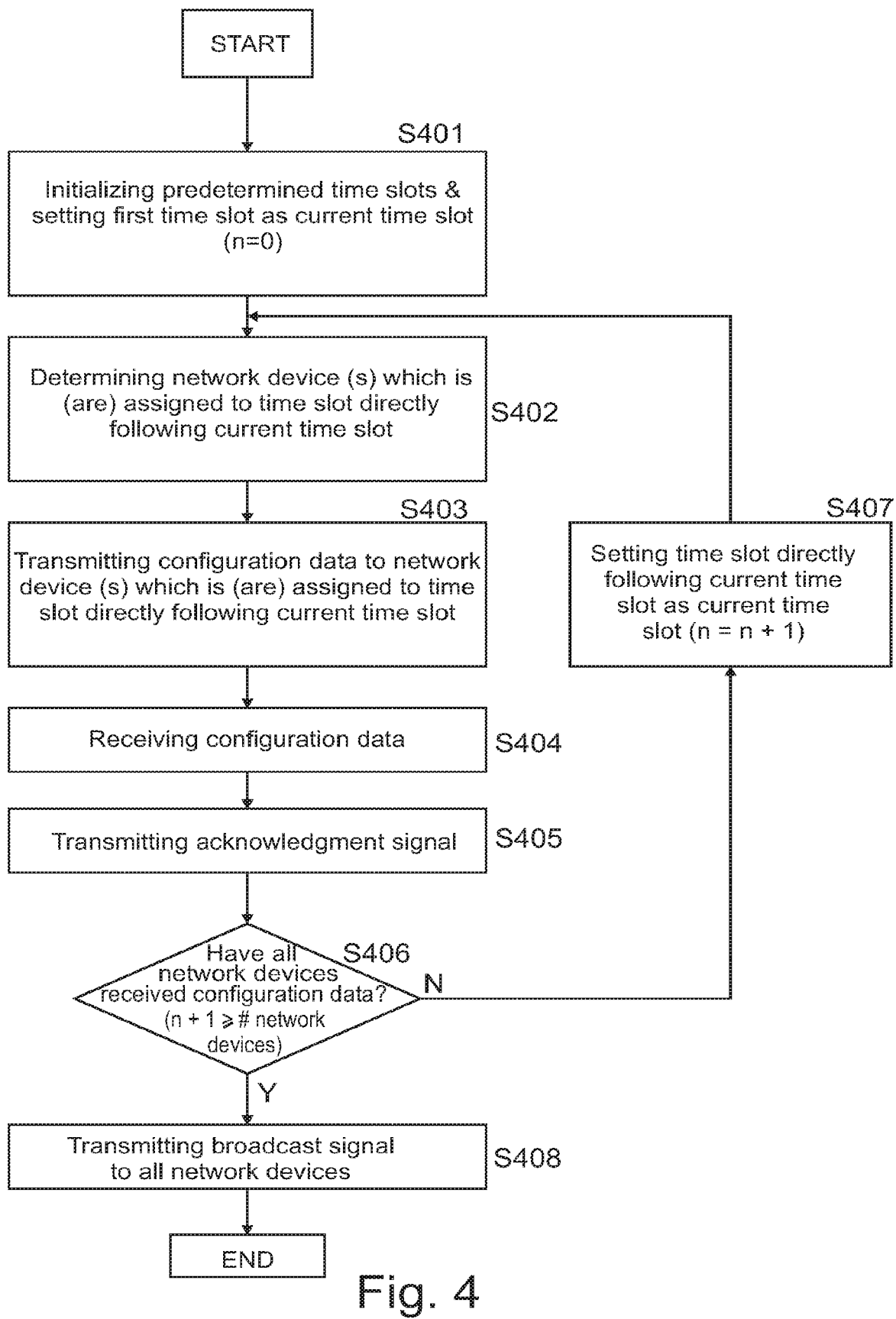
FIG. 4 is a flow chart describing distribution of configuration data in accordance with exemplary embodiments.

FIG. 4 is a flow chart describing distribution of configuration data according to step S33 of FIG. 3 in greater detail in accordance with exemplary embodiments.

In step S401, an initialization of the predetermined time slots is performed. In this regard, a first time slot is set as the current time slot (i.e., a "time slot"-variable n is set to 0 (n=0)). The predetermined time slots serve for transmitting the configuration data. Specifically, the gateway device 22 and each one of the plurality of network devices 23-1 to 23-8 are assigned to the predetermined time slots, wherein the gateway device 22 is assigned to the first time slot and each one of the plurality of network devices 23-1 to 23-8 is assigned to a time slot subsequent to the first time slot. The gateway device 22 and each one of the plurality of network devices 23-1 to 23-8 are merely enabled to transmit the configuration data during the respective predetermined time slots to which they are respectively assigned. This means, the gateway device 22 is e.g. merely enabled to transmit the configuration data during the first time slot. Once the predetermined time slots are initialized and the first time slot is set as the current time slot, it is proceeded to step S402.

In step S402 during the first time slot set as the current time slot (i.e., when the current time slot is the first time slot), the gateway device 22 determines, from the configuration data, at least one of the plurality of network devices 23-1 to 23-8 from the MESH network of wireless fire devices 23 which is assigned to the time slot directly following the current time slot (i.e., the second time slot). Then, it is proceeded to step S403.

In step S403 during the first time slot set as the current time slot (i.e., when the current time slot is the first time slot), the gateway device 22 transmits the configuration data to the at least one of the plurality of network devices 23-1 to 23-8 which is assigned to the time slot directly following the current time slot (i.e., the second time slot). Then, it is proceeded to step S404.

According to exemplary embodiments of the present invention, up to 32 network devices may be assigned to the time slot directly following the first time slot. That is, the gateway device 22 may transmit the configuration data to up to 32 network devices.

In step S404 during the first time slot set as the current time slot (i.e., when the current time slot is the first time slot), the at least one of the plurality of network devices 23-1 to 23-8 which is assigned to the time slot directly following the current time slot receives the configuration data. Then, it is proceeded to step S405.

In step S405 during the first time slot set as the current time slot (i.e., when the current time slot is the first time slot), the at least one of the plurality of network devices 23-1 to 23-8 which has received the configuration data from the gateway device 22 forwards/transmits an acknowledgment signal to the gateway device 22, thereby acknowledging reception of the configuration data. Then, it is proceeded to step S406.

In step S406, it is determined whether each one of the plurality of network devices 23-1 to 23-8 has received the configuration data. This determination is performed in that it is determined whether the "time slot"-variable n incremented by 1 is greater than or equal to the total number of network devices 23-1 to 23-8.

In case it is determined in step S406 that not each one of the plurality of network devices 23-1 to 23-8 has received the configuration data ("NO" in step S406), it is proceeded to step S407.

In case it is determined in step S406 that each one of the plurality of network devices 23-1 to 23-8 has received the configuration data ("YES" in step S406), it is proceeded to step S408, which will he described later.

In step S407, the "time slot"-variable n is incremented by one (n=n+1). In this regard, the time slot directly following the current time slot is set as the current time slot. Then, it is proceeded to step S402.

In step S402 during a time slot subsequent to the first time slot and set as the current time slot (i.e., when the current time slot is a time slot subsequent to the first time slot), each one of the plurality of network devices 23-1 to 23-8 having received the configuration data in the time slot preceding the current time slot determines, from the configuration data, another at least one of the plurality of network devices 23-1 to 23-8 from the MESH network of wireless fire devices 23 which is assigned to the time slot directly following the current time slot. Then, it is proceeded to step S403.

In step S403 during a time slot subsequent to the first time slot and set as the current time slot (i.e., when the current time slot is a time slot subsequent to the first time slot), each one of the plurality of network devices 23-1 to 23-8 having received the configuration data in the time slot preceding the current time slot, transmits the configuration data to the other at least one of the plurality of network devices 23-1 to 23-8 which is assigned to the time slot directly following the current time slot. Then, it is proceeded to step S404.

In step S404 during a time slot subsequent to the first time slot and set as the current time slot (i.e., when the current time slot is a time slot subsequent to the first time slot), the other at least one of the plurality of network devices 23-1 to 23-8 which is assigned to the time slot directly following the current time slot receives the configuration data. Then, it is proceeded to step S405.

In step S405 during a time slot subsequent to the first time slot and set as the current time slot (i.e., when the current time slot is a time slot subsequent to the first time slot), the other at least one of the plurality of network devices 23-1 to 23-8 which has received the configuration data transmits an acknowledgment signal to the at least one of the plurality of network devices 23-1 to 23-8 from which it has received the configuration data (whereby the acknowledgement signal is forwarded to the gateway device 22), thereby acknowledging reception of the configuration data. Then, it is proceeded to step S406.

Each one of the plurality of network devices 23-1 to 23-8 is addressed by means of its unique physical identifier which may be a serial number stored in its non-volatile memory. The communication may be performed using a factory default communication channel and a factory default network ID.

In case it is determined in step S406 that not each one of the plurality of network devices 23-1 to 23-8 has received the configuration data ("NO" in step S406), it is proceeded to step S407, which has been described above.

In case it is determined in step S406 that each one of the plurality of network devices 23-1 to 23-8 has received the configuration data ("YES" in step S406), it is proceeded to step S408.

In step S408, the gateway device 22 transmits a broadcast signal to each one of the plurality of network devices 23-1 to 23-8 indicating that each one of the plurality of network devices 23-1 to 23-8 is configured. Thereby, each one of the plurality of network devices 23-1 to 23-8 is informed that the MESH network of wireless fire devices 23 is configured. Then, each one of the plurality of network devices 23-1 to 23-8 switches from the default communication channel and the default network ID to a dedicated communication channel and a dedicated network ID, respectively. The dedicated communication channel and the dedicated network ID are different from the default communication channel and the default network ID, respectively.

According to the present invention, the costs of installing and maintaining a wireless fire detection system may be reduced. Also, the configuration of such wireless fire detection system may be conveniently and cost-efficiently modified. Specifically, there is provided an improved method for configuring a plurality of network devices of a wireless fire detection system by means of which configuration of the plurality of network devices is less time consuming and more user-friendly.

That which is claimed is:

1. A wireless fire detection system, comprising:
a wired fire detection system having a control panel and a number of wired fire devices including one or more gateways to allow expansion of the wired system with a plurality of wireless devices by connection of the wireless devices to a wired network through the one or more gateways wherein a configuration device determines, configuration data for a plurality of network devices, the configuration data, wherein the configuration device transmits, the configuration data to a gateway device, wherein the gateway device distributes the configuration data to a first one of the plurality of network devices: and
a wireless configuration device that is interconnected with the one or more gateways and wireless devices to accomplish a set up process wherein the first one of the plurality of network devices distributes the configuration data to a second one of the plurality of network devices.

2. The system of claim 1, further comprising:
wherein the wireless configuration device determines configuration data for the plurality of wireless devices, the configuration data including a respective preconfigured time slot for each of the plurality of wireless devices.

3. The system of claim 2, further comprising:
wherein the configuration device transmits the configuration data to the gateway device; and
wherein the gateway device distributes the configuration data to a first one of the plurality of wireless devices during the respective preconfigured time slot for the first one of the plurality of wireless devices.

4. The system of claim 3, further comprising:
wherein the first one of the plurality of wireless devices distributes the configuration data to a second one of the plurality of wireless devices during the respective preconfigured time slot for the second one of the plurality of wireless devices.

5. A wireless fire detection system, comprising:
a configuration device and a gateway device, wherein the configuration device determines, configuration data for a plurality of network devices, the configuration data including a respective preconfigured time slot for each of the plurality of network devices; wherein the configuration device transmits, the configuration data to the gateway device; wherein the gateway device distributes the configuration data to a first one of the plurality of network devices during the respective preconfigured time slot for the first one of the plurality of network devices; and
wherein the first one of the plurality of network devices distributes the configuration data to a second one of the plurality of network devices during the respective preconfigured time slot for the second one of the plurality of network devices.

6. The system of claim 5, further comprising:
wherein during a first time slot set as a current time slot, the gateway device, identifies the first one of the plurality of network devices from the configuration data by comparing the current time slot to the respective preconfigured which is assigned to the time slot for the first one of the plurality of network devices directly following the current time slot;
wherein the respective preconfigured time slot for the first one of the plurality of network devices directly follows the first time slot;
wherein the gateway device transmits the configuration data to the at least one of the plurality of network devices which is assigned to the time slot directly following the current time slot; and
wherein the at least one of the plurality of network devices, which is assigned to the time slot directly following the current time slot, receives the configuration data.

7. The system of claim 6, further comprising:
wherein during a second time slot subsequent to the first time slot and set as the current time slot, the first one of the plurality of network devices identifying the second one of the plurality of network devices from the configuration data by comparing the current time slot to the respective preconfigured time slot for the second one of the plurality of network devices; and
wherein the respective preconfigured time slot for the second one of the plurality of network devices directly follows the second time slot.

8. The system of claim 7, further comprising:
wherein the configuration device transmits the configuration data to the first one of the plurality of network devices using a default communication channel and a default network ID.

9. The system of claim 8, further comprising:
wherein the first one of the plurality of network devices and the second one of the plurality of network devices transmits an acknowledgment signal to the gateway device after receiving the configuration data.

10. The system of claim 9, further comprising:
wherein, upon receiving the acknowledgment signal from each one of the plurality of network devices, the gateway device transmits a broadcast signal to each one of the plurality of network devices indicating that each one of the plurality of network devices is configured.

11. The system of claim 10, further comprising:
wherein, upon receiving the broadcast signal from the gateway device, each of the plurality of network devices switches from the default communication channel and the default network ID to a dedicated communication channel and a dedicated network ID identified in the configuration data.

12. The system of claim 11, further comprising:
wherein, during a first time slot set as a current time slot, the gateway device identifies the first one of the plurality of network devices from the configuration data by comparing the current time slot to the respective preconfigured time slot for the first one of the plurality of network devices; and
wherein the respective preconfigured time slot for the first one of the plurality of network devices directly follows the first time slot.

13. The system of claim 12, further comprising:
wherein, during a second time slot subsequent to the first time slot and set as the current time slot, the first one of the plurality of network devices identifies the second one of the plurality of network devices from the configuration data by comparing the current time slot to the respective preconfigured time slot for the second one of the plurality of network devices; and
wherein the respective preconfigured time slot for the second one of the plurality of network devices directly follows the second time slot.

14. A wireless fire detection system, comprising:
a configuration device, a gateway device wirelessly communicating with the configuration device, and a plurality of network devices wirelessly communicating with the gateway device and with the other network devices;
wherein the configuration device determines configuration data of each one of the plurality of network devices for configuring each one of the plurality of network devices, the configuration data including a respective preconfigured time slot for each of the plurality of network devices;
wherein the configuration device, transmits the configuration data to the gateway device; and
wherein, upon receiving the configuration data from the configuration device, the gateway device distributes the configuration data to each one of the plurality of network devices according to predetermined time slots corresponding to each network device for transmitting the configuration data; and wherein a first one of the plurality of network devices distributes the configuration data to a second one of the plurality of network devices during the respective preconfigured time slot for the second one of the plurality of network devices.

15. The system of claim 14, further comprising:
wherein, during a first time slot set as a current time slot, the gateway device determines, from the configuration data, at least one of the plurality of network devices which is assigned to the time slot directly following the current time slot;
wherein the gateway device transmits the configuration data to the at least one of the plurality of network devices which is assigned to the time slot directly following the current time slot; and
wherein the at least one of the plurality of network devices, which is assigned to the time slot directly following the current time slot, receives the configuration data.

16. The system of claim 15, further comprising:
wherein, during a time slot subsequent to the first time slot and set as the current time slot,
each one of the plurality of network devices having received the configuration data in the time slot directly preceding the current time slot determines, from the configuration data, another at least one of the plurality of network devices which is assigned to the time slot directly following the current time slot;
wherein each one of the plurality of network devices, having received the configuration data in the time slot directly preceding the current time slot, transmits the configuration data to the other at least one of the plurality of network devices which is assigned to the time slot directly following the current time slot; and
wherein the other at least one of the plurality of network devices, which is assigned to the time slot directly following the current time slot, receives the configuration data.

17. The system of claim 14, further comprising:
wherein the configuration data is transmitted using a default communication channel and a default network ID.

18. The system of claim 17, further comprising:
wherein each one of the plurality of network devices having received the configuration data transmits an acknowledgment signal to the gateway device.

19. The system of claim 18, further comprising:
wherein, upon receiving the acknowledgment signal from each one of the plurality of network devices, the gateway device transmits a broadcast signal to each one of the plurality of network devices indicating that each one of the plurality of network devices is configured.

20. The system of claim 19, further comprising:
wherein, upon receiving the broadcast signal from the gateway device, each one of the plurality of network devices switches from the default communication channel and the default network ID to a dedicated communication channel and a dedicated network ID.

* * * * *